United States Patent
Yang et al.

(10) Patent No.: US 11,519,874 B2
(45) Date of Patent: Dec. 6, 2022

(54) HUMIDITY SENSOR

(71) Applicant: ELECTRONICS AND TELECOMMUNICATIONS RESEARCH INSTITUTE, Daejeon (KR)

(72) Inventors: Woo Seok Yang, Daejeon (KR); Sunghoon Hong, Daejeon (KR); Gyu Ri Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/406,786

(22) Filed: Aug. 19, 2021

(65) Prior Publication Data

US 2022/0057354 A1 Feb. 24, 2022

(30) Foreign Application Priority Data

Aug. 24, 2020 (KR) .................. 10-2020-0106167
Jan. 14, 2021 (KR) .................. 10-2021-0005090

(51) Int. Cl.
*G01N 27/22* (2006.01)

(52) U.S. Cl.
CPC ......... *G01N 27/223* (2013.01); *G01N 27/226* (2013.01)

(58) Field of Classification Search
CPC ... G01N 27/223; G01N 27/226; G01N 27/227
See application file for complete search history.

(56) References Cited

U.S. PATENT DOCUMENTS

| | | | |
|---|---|---|---|
| 6,742,387 B2 | 6/2004 | Hamamoto et al. | |
| 2003/0179805 A1 | 9/2003 | Hamamoto et al. | |
| 2005/0079386 A1* | 4/2005 | Brown | B82Y 10/00 428/690 |
| 2009/0151429 A1 | 6/2009 | Jun et al. | |
| 2010/0019230 A1* | 1/2010 | Lee | H01L 51/0591 257/E51.023 |
| 2010/0014070 A1 | 6/2010 | Jun et al. | |
| 2010/0140596 A1* | 6/2010 | Noh | H01L 51/052 257/E51.027 |
| 2012/0178253 A1* | 7/2012 | Ahn | H01L 21/02274 257/E21.24 |
| 2018/0231403 A1* | 8/2018 | Tsai | G01D 21/02 |
| 2021/0055246 A1 | 2/2021 | Seok et al. | |

FOREIGN PATENT DOCUMENTS

| | | |
|---|---|---|
| KR | 20030076388 A | 9/2003 |
| KR | 20200001155 A | 1/2020 |
| KR | 1020210024320 A | 3/2021 |

\* cited by examiner

*Primary Examiner* — Alvaro E Fortich (57) ABSTRACT

A humidity sensor is provided. The humidity sensor includes a flexible substrate, a moisture absorption prevention layer covering the flexible substrate, a dielectric layer on the moisture absorption prevention layer, hydrophobic patterns on the dielectric layer, a first electrode between the moisture absorption prevention layer and the dielectric layer, and a second electrode spaced apart from the first electrode between the moisture absorption prevention layer and the dielectric layer. The first electrode has a thickness greater than that of the moisture absorption prevention layer.

15 Claims, 12 Drawing Sheets

HUMIDITY SENSOR

CROSS-REFERENCE TO RELATED APPLICATIONS

This U.S. non-provisional patent application claims priority under 35 U.S.C. § 119 of Korean Patent Application Nos. 10-2020-0106167, filed on Aug. 24, 2020, and 10-2021-0005090, filed on Jan. 14, 2021, the entire contents of which are hereby incorporated by reference.

BACKGROUND

The present disclosure herein relates to a humidity sensor, and more particularly, to a flexible humidity sensor including a moisture absorption prevention layer.

A capacitive humidity measuring apparatus may include a humidity sensitive dielectric layer formed on a flexible support to absorb or desorb water vapor according to humidity of surrounding environments. In a commercialized chip-type humidity sensor, a silicon (Si) substrate, on which a glass or silicon oxide ($SiO_2$) insulating layer is formed, as a support to support a capacitor. However, in a flexible humidity sensor, a polymer such as poly(ethylene terephthalate) (PET), polyimide (PI), and the like is used as a support. Thus, in the flexible humidity sensor, water vapor is also absorbed by the support disposed under the dielectric layer. Accordingly, when the humidity is changed, not only a variation in amount of water vapor absorbed by the polymer dielectric layer, but also a variation in amount of water vapor absorbed by the polymer support may contribute to a variation in capacitance of the capacitor.

SUMMARY

The present disclosure provides a humidity sensor having a short response time and high accuracy.

An embodiment of the inventive concept provides a humidity sensor including: a flexible substrate; a moisture absorption prevention layer covering the flexible substrate; a dielectric layer on the moisture absorption prevention layer; hydrophobic patterns on the dielectric layer; a first electrode between the moisture absorption prevention layer and the dielectric layer; and a second electrode spaced apart from the first electrode between the moisture absorption prevention layer and the dielectric layer, wherein the first electrode has a thickness greater than that of the moisture absorption prevention layer.

In an embodiment, the moisture absorption prevention layer may cover top, bottom, side surfaces of the substrate.

In an embodiment, the dielectric layer may be in direct contact with the moisture absorption prevention layer between the first electrode and the second electrode.

In an embodiment, the moisture absorption prevention layer may have a water vapor transmission rate (WVTR) less than that of each of the flexible substrate and the dielectric layer.

In an embodiment, the moisture absorption prevention layer may include one of $Al_2O_3$, ZnO, $ZrO_2$, $TiO_2$, $HfO_2$, $SiO_x$, $SiN_x$, $SiOxN_y$, and ceramic.

In an embodiment, the hydrophobic patterns may include a first hydrophobic pattern on the first electrode, a second hydrophobic pattern on the second electrode, and a third hydrophobic pattern between the first electrode and the second electrode.

In an embodiment, the flexible substrate may include one of PET, PEN, PC, PES, and PI polymer.

In an embodiment, the dielectric layer may include at least one of cellulose acetate butyrate (CAB), PI, polymethyl methacrylate (PMMA), poly(hydroxyethyl methacrylate) (PHEMA), or poly(tetrafluoroethylene) (PTFE) polymer.

In an embodiment, each of the hydrophobic patterns may have a width that gradually decreases as a distance from a top surface of the flexible substrate increases.

In an embodiment, the dielectric layer may have a thickness more than that of the moisture absorption prevention layer.

In an embodiment of the inventive concept, a humidity sensor includes: a substrate; a moisture absorption prevention layer covering top, bottom, and side surfaces of the substrate; a first electrode on the moisture absorption prevention layer; a second electrode spaced apart from the first electrode on the moisture absorption prevention layer; and a dielectric layer covering the first electrode and the second electrode, wherein the dielectric layer covers a top surface of the moisture absorption prevention layer between the first electrode and the second electrode.

In an embodiment, the humidity sensor may further include a hydrophobic pattern on the dielectric layer.

In an embodiment, the moisture absorption prevention layer may have a water vapor transmission rate (WVTR) less than that of each of the flexible substrate and the dielectric layer.

In an embodiment, the moisture absorption prevention layer may include one of $Al_2O_3$, ZnO, $ZrO_2$, $TiO_2$, $HfO_2$, $SiO_x$, $SiN_x$, $SiOxN_y$, and ceramic.

In an embodiment, the humidity sensor may further include: a third electrode between the moisture absorption prevention layer and the dielectric layer; and an upper moisture absorption prevention layer between the third electrode and the dielectric layer.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Embodiments of the inventive concept will be described with reference to the accompanying drawings so as to sufficiently understand constitutions and effects of the inventive concept. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. A person with ordinary skill in the technical field of the present invention pertains will be understood that the present invention can be carried out under any appropriate environments.

In the following description, the technical terms are used only for explaining a specific embodiment while not limiting the present invention. In this specification, the terms of a singular form may include plural forms unless specifically mentioned. The meaning of 'comprises' and/or 'comprising' specifies a component, a step, an operation and/or an element does not exclude other components, steps, operations and/or elements.

In the specification, it will be understood that when a layer (or film) is referred to as being 'on' another layer or substrate, it can be directly on the other layer or substrate, or intervening layers may also be present.

Also, though terms like a first and a second are used to describe various regions and layers (or films) in various embodiments of the present invention, the regions and the layers are not limited to these terms. These terms are used only to discriminate one region or layer (or film) from another region or layer (or film). Therefore, a layer referred to as a first layer in one embodiment can be referred to as a second layer in another embodiment. An embodiment described and exemplified herein includes a complementary embodiment thereof. Like reference numerals refer to like elements throughout.

Unless terms used in embodiments of the present invention are differently defined, the terms may be construed as meanings that are commonly known to a person skilled in the art.

Figure 1:
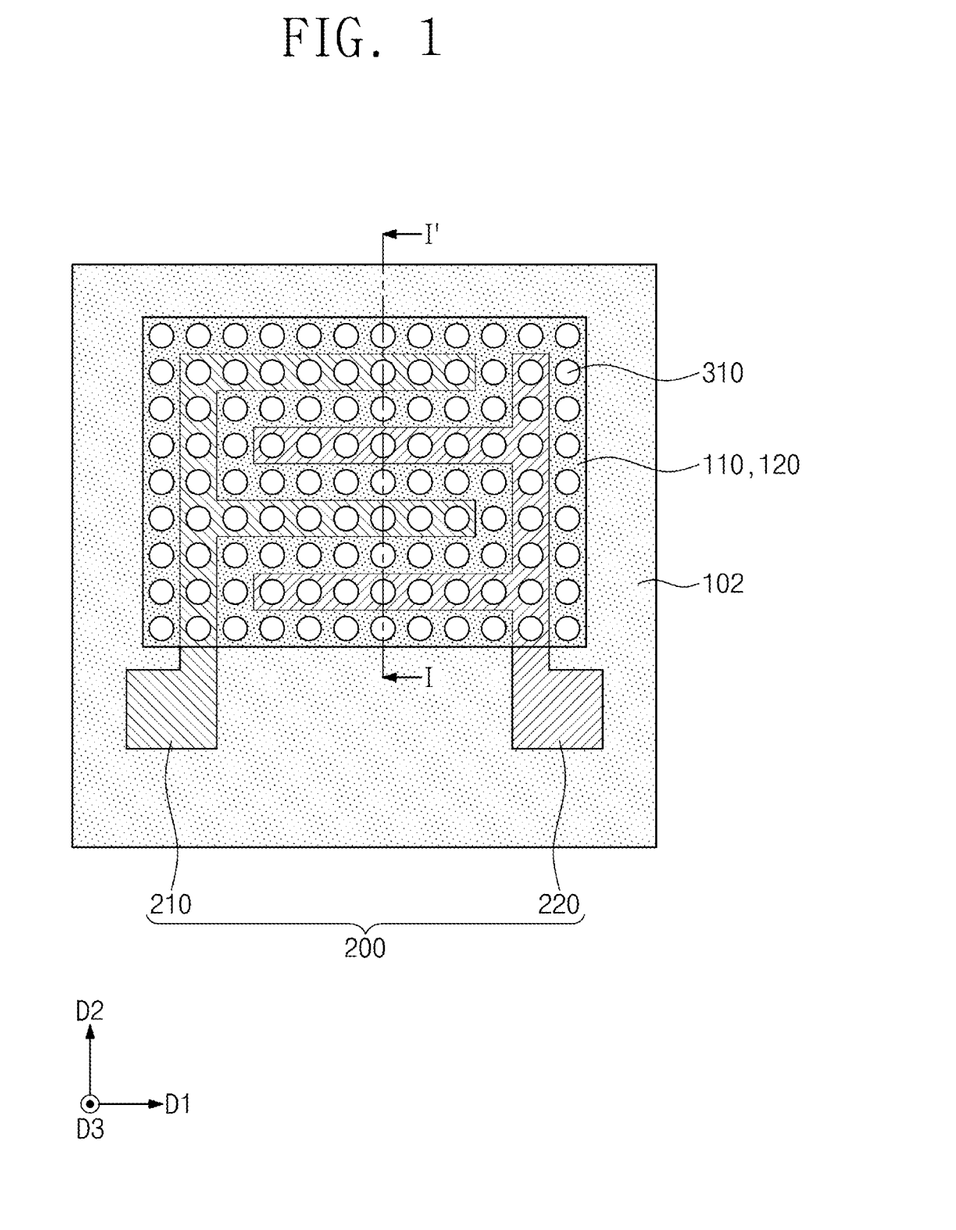
FIG. 1 is a plan view of a humidity sensor according to embodiments of the inventive concept.
Figure 2:
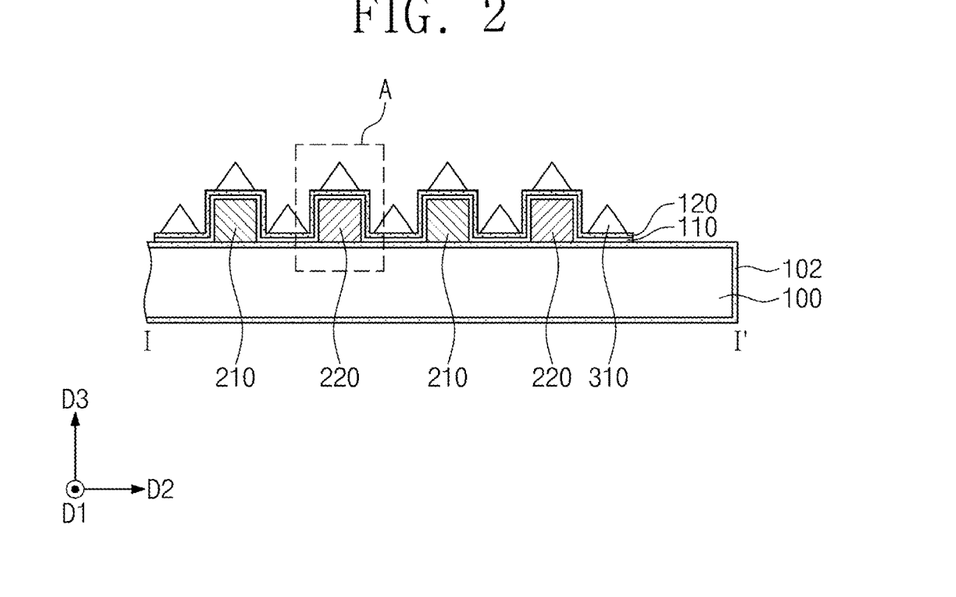
FIG. 2 is a cross-sectional view taken along line I-I' of FIG. 1.

FIG. 1 is a plan view of a humidity sensor according to embodiments of the inventive concept. FIG. 2 is a cross-sectional view taken along line I-I' of FIG. 2.

Referring to FIGS. 1 and 2, a humidity sensor according to embodiments of the inventive concept may include a substrate 100, a moisture absorption prevention layer 102, electrodes 200, a dielectric layer 110, a buffer layer 120, and a hydrophobic pattern 310.

The substrate 100 may be disposed at a lower portion of the humidity sensor to support the electrodes. The substrate 100 may have a constant thickness and have a flat top surface. The substrate 100 may include a flexible substrate. For example, the substrate 100 may include at least one of polyethylene terephthalate (PET), polyester, polycarbonate (PC), polyimide (PI), polyethylene naphthalate (PEN), polyether ether ketone (PEEK), polyarylate (PAR), polycyclicolefin (PCO), polynorbornene, polyethersulphone (PES), or cycloolefin polymer (COP).

Figure 3:
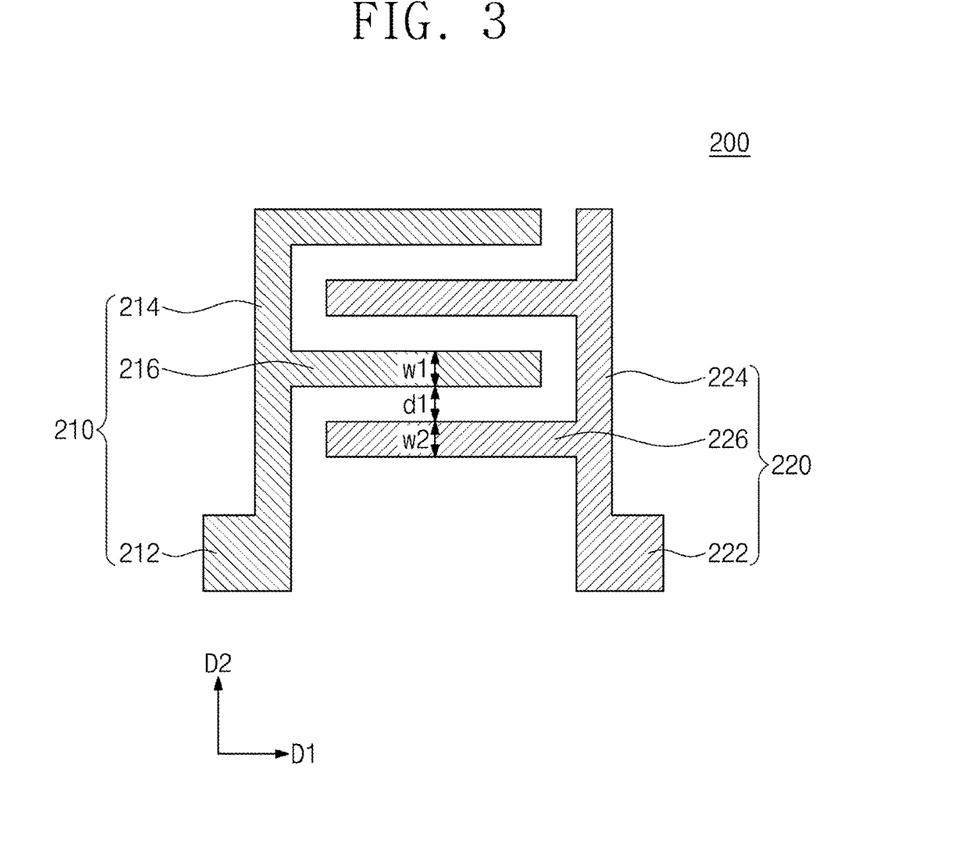
FIG. 3 is a plan view of electrodes according to embodiments of the inventive concept.

FIG. 3 is a plan view of the electrodes according to embodiments of the inventive concept.

Referring to FIGS. 1 to 3, the electrodes 200 may be provided on the top surface of the substrate 100. The electrodes 200 may include one of silver (Ag), aluminum (Al), gold (Au), and copper (Cu). Each of the electrodes 200 may include a single metal layer or a multilayer metal layer. For example, the multilayer metal layer may include a first metal layer and a second metal layer surrounding the first metal layer, and the second metal layer may include gold (Au). The electrodes 200 may include a first electrode 210 and a second electrode 220, which are spaced apart from each other in the first direction D1. The first electrode 210 may include a first pad part 212, a first connection part 214, and a first extension part 216. The second electrode 220 may include a second pad part 222, a second connection part 224, and a second extension part 226.

Each of the first pad part 212 and the second pad part 222 may be a portion which is connected to an external element of the humidity sensor and outputs an electrical signal generated between the first electrode 210 and the second electrode 220. Each of the first pad part 212 and the second pad part 222 may have a width greater than that of each of the first and second connection parts 214 and 222 and the first and second extension parts 216 and 226.

The first connection part 214 may extend from the first pad part 212 in a second direction D2 perpendicular to the first direction. The second connection part 224 may extend from the second pad part 222 in the second direction D2. The first connection part 214 and the second connection part 224 may extend in parallel to each other, and a distance between the first connection part 214 and the second connection part 224 may be constant along the second direction D2. The first connection part 214 may electrically connect the first extension parts 216 to the first pad part 212 to transmit electrical signals generated by the first extension parts 216 to the first pad part 212. The second connection part 224 may electrically connect the second extension parts 226 to the second pad part 222 to transfer electrical signals generated by the second extension parts 226 to the second pad part 222. Each of the first connection part 214 and the second connection part 224 may have a width that is equal to or greater than that of each of the first and second extension parts 216 and 226.

The first extension parts 216 may be commonly connected to the first connection part 214, and the second extension parts 226 may be commonly connected to the second connection part 224. The first extension parts 216 may extend from the first connection part 214 toward the second connection part 224. The second extension parts 226 may extend from the second connection part 224 toward the first connection part 214. The first extension parts 216 and the second extension parts 226 may be adjacent to each other in the second direction D2. Also, the first extension parts 216 and the second extension parts 226 may be alternately disposed along the second direction D2.

A width w1 of each of the first extension parts 216 may be the same as a width w2 of each of the second extension parts 226. For example, the width w1 of each of the first extension parts 216 and the width w2 of each of the second extension parts 226 may have a value in the range of about 3 μm to about 100 μm. A distance d1 between the first and second extension parts 216 and 226 adjacent to each other may have a value in the range of about 3 μm to about 100 μm. Here, a penetration depth through which fringing fields of the first extension part 216 and the second extension part 226, which are adjacent to each other, are transmitted from the top surface of the substrate 100 may be greater than the distance d1 between the first extension part 216 and the second extension part 226. Thus, when a dielectric constant of the substrate 100 varies, capacitance between the first electrode 210 and the second electrode 220 may vary. For example, when the substrate 100 absorbs moisture, the dielectric constant of the substrate 100 may increase, and the capacitance between the first electrode 210 and the second electrode 220 may also increase.

Figure 4:
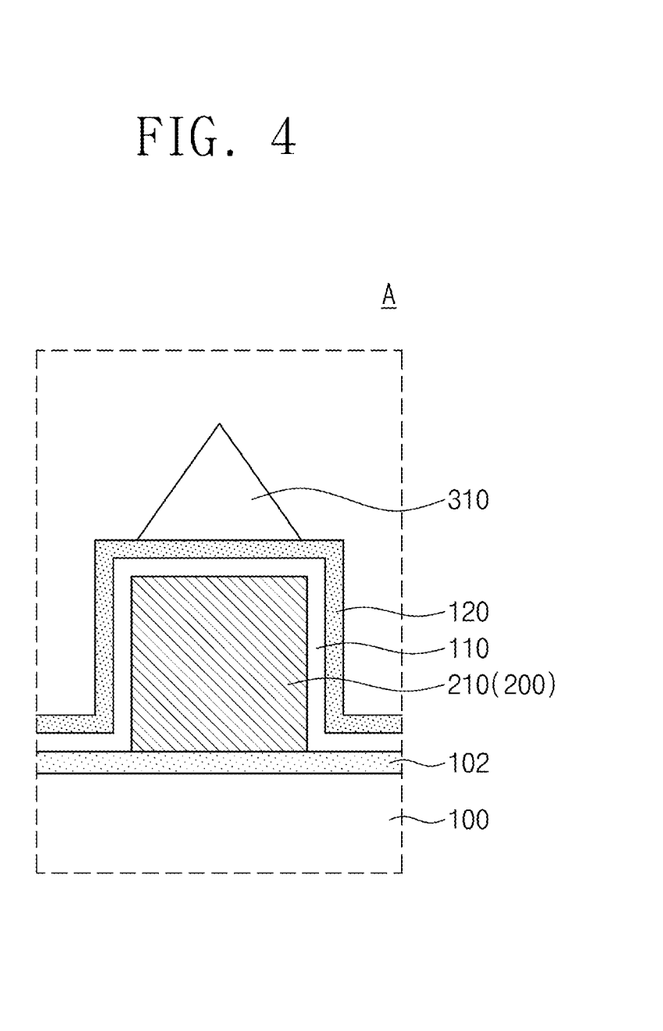
FIG. 4 is an enlarged cross-sectional view of a portion A of FIG. 2.

Referring to FIG. 4 together with FIGS. 1 and 2, a moisture absorption prevention layer 102 may be provided between the substrate 100 and the electrodes 200 and between the substrate 100 and the dielectric layer 110. The moisture absorption prevention layer 102 may cover the top surface, a bottom surface, and side surfaces of the substrate 100. For example, the moisture absorption prevention layer 102 may completely surround the substrate 100 to prevent the surface of the substrate 100 from being exposed to the atmosphere. The moisture absorption prevention layer 102 may have a thinner thickness than the substrate 100.

The moisture absorption prevention layer 102 may have a water vapor transmission rate (WVTR) less than that of each of the substrate 100 and the dielectric layer 110. The moisture absorption prevention layer 102 may include, for example, $Al_2O_3$, ZnO, $ZrO_2$, $TiO_2$, $HfO_2$, $SiO_x$, $SiN_x$, $SiOxN_y$, ceramic single layer, or a ceramic multilayer that is a combination thereof. The moisture absorption prevention layer 102 may prevents the substrate 100 from absorbing the moisture to prevent capacitance between the first electrode 210 and the second electrode 220 from varying due to the substrate 100. The moisture absorption prevention layer 102 may be formed by an R2R ALD, R2R PEALD, R2R AP-ALD, R2R AP-PEALD, R2R PECVD or R2R AP-PECVD process.

The moisture absorption prevention layer 102 may have a thinner thickness than the electrodes 200. The electrodes 200 may have a greater thickness than the moisture absorption prevention film 102, and a fringe electric field between the electrodes 200 may pass through the moisture absorption prevention film 102 and extend below the upper surface of the substrate. For example, a penetration depth through which the fringe electric field penetrates into the substrate 100 may be 127 μm or more from the top surface of the substrate 100. The moisture absorption prevention film 102 having a thinner thickness than the electrodes 200 may shorten the time it takes for the change in capacitance of the capacitor to be saturated while minimizing the effect on the fringing electric field. For example, the electrodes 200 may have a thickness of 0.1 μm to 15 μm. The moisture absorption prevention layer 102 may have a thin thickness compared to the thickness of the electrode 200 and the penetration depth of the fringe electric field. The moisture absorption prevention film 102 may have a thickness of 10 nm to 100 nm.

The dielectric layer 110 may be provided on the substrate 100. The dielectric layer 110 may cover at least a portion of the electrodes 200. The dielectric layer 110 may be provided between the electrodes 200 to constitute a capacitor together with the electrodes 200. The dielectric layer 110 may include a humidity sensitive dielectric layer. The dielectric layer 110 may include, for example, at least one of cellulose acetate butyrate (CAB), PI, polymethyl methacrylate (PMMA), poly(hydroxyethyl methacrylate) (PHEMA), or poly(tetrafluoroethylene) (PTFE) polymer.

Particularly, the dielectric layer 110 may cover the side surfaces and the top surfaces of the first and second extension parts 216 and 226, which are described with reference to FIG. 3. The first extension part 216 and the second extension part 226 may be surrounded by the moisture absorption prevention layer 102 and the dielectric layer 110.

A portion of the first connection part 214 and a portion of the second connection part 224 may be covered by the dielectric layer 110. The first pad part 212 and the second pad part 222 may not be covered by the dielectric layer 110. The dielectric layer 110 may be disposed between the first electrode 210 and the second electrode 220 to constitute the capacitor together with the first electrode 210 and the second electrode 220. The thickness of the dielectric layer 110 may be thicker than the thickness of the moisture absorption prevention layer 102.

A buffer layer 120 may be provided on the dielectric layer 110. The buffer layer 120 may conformally cover the dielectric layer 110. The buffer layer 120 may be spaced apart from the first electrode 210 and the second electrode 220 with the dielectric layer 110 therebetween. The buffer layer 120 may be patterned together with the dielectric layer 110, and side surfaces of the buffer layer 120 may be aligned with the side surfaces of the dielectric layer 110. The buffer layer 120 may include, for example, a hydrophobic polymer or an organic/inorganic hybrid material. The buffer layer 120 may be, for example, a hydrophobic self-assembled monolayer (SAM) surface layer.

Hydrophobic patterns 310 may be provided on the buffer layer 120. The hydrophobic patterns 310 may be entirely provided on the top surface of the buffer layer 120. The hydrophobic patterns 310 may be spaced apart from each other in the first direction D1 and the second direction D2. The hydrophobic patterns 310 may be provided on and between the electrodes 200. Particularly, the hydrophobic patterns 310 may be provided on the top surface of the first electrode 210, on the top surface of the second electrode 220, and between the first electrode 210 and the second electrode 220. Each of the hydrophobic patterns 310 provided on the top surface of the first electrode 210 and the top surface of the second electrode 220 may be disposed at a level higher than that of each of the hydrophobic patterns 310 provided between the first electrode 210 and the second electrode 220. According to embodiments, each of the top surfaces of the hydrophobic patterns 310 provided between the first electrode 210 and the second electrode 220 may be disposed at a level lower than that of each of the top surface of the first electrode 210 and the top surface of the second electrode 220.

According to embodiments, each of the hydrophobic patterns 310 may have a width that gradually decreases as the distance from the substrate 100 increases. A width of a lower end of the hydrophobic pattern 310 may not be larger than that of the first electrode 210, and an upper end of the hydrophobic pattern 310 may have a pointed shape. Each of the hydrophobic patterns 310 may have, for example, a conical shape.

EXPERIMENTAL EXAMPLE

A humidity sensor was manufactured according to the embodiments of the inventive concept, which are illustrated in FIGS. 1 to 4. Particularly, after forming a moisture absorption prevention layer on a substrate, electrodes, a dielectric layer, a buffer layer, and a hydrophobic pattern were formed to manufacture the humidity sensor. After exposing the humidity sensor to an environment having high humidity, capacitance between the electrodes was measured and shown in FIG. 5A.

COMPARATIVE EXAMPLE

A humidity sensor was manufactured similarly to the embodiments of the inventive concept, which are illustrated in FIGS. 1 to 4, but electrodes were directly formed on a substrate without forming a moisture absorption prevention layer on the substrate. Subsequently, a dielectric layer, a buffer layer, and a hydrophobic pattern were formed to manufacture the humidity sensor. After exposing the humidity sensor according to Comparative Example to an environment having high humidity, capacitance between the electrodes was measured and shown in FIG. 5B.

Figure 5A:
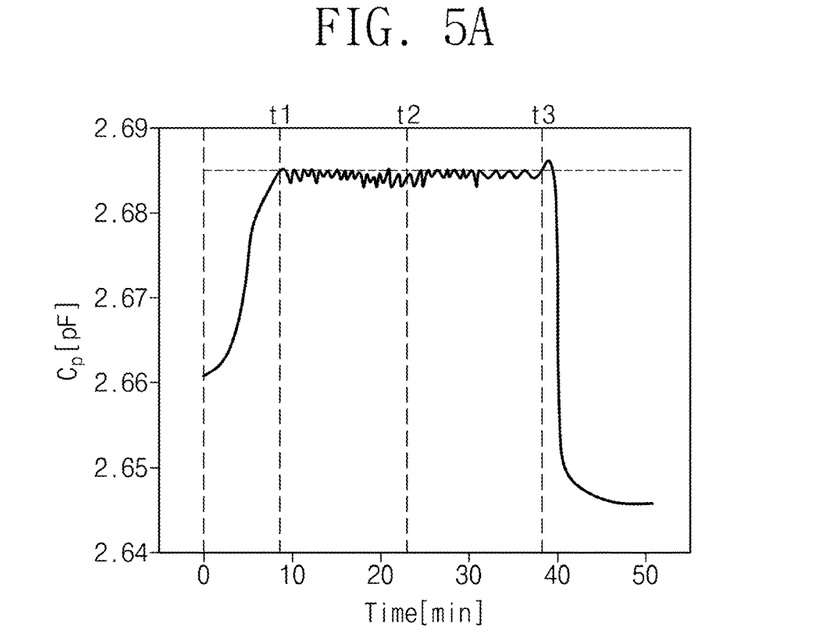
FIG. 5A is a graph illustrating capacitance depending on Experimental Example of the inventive concept.
Figure 5B:
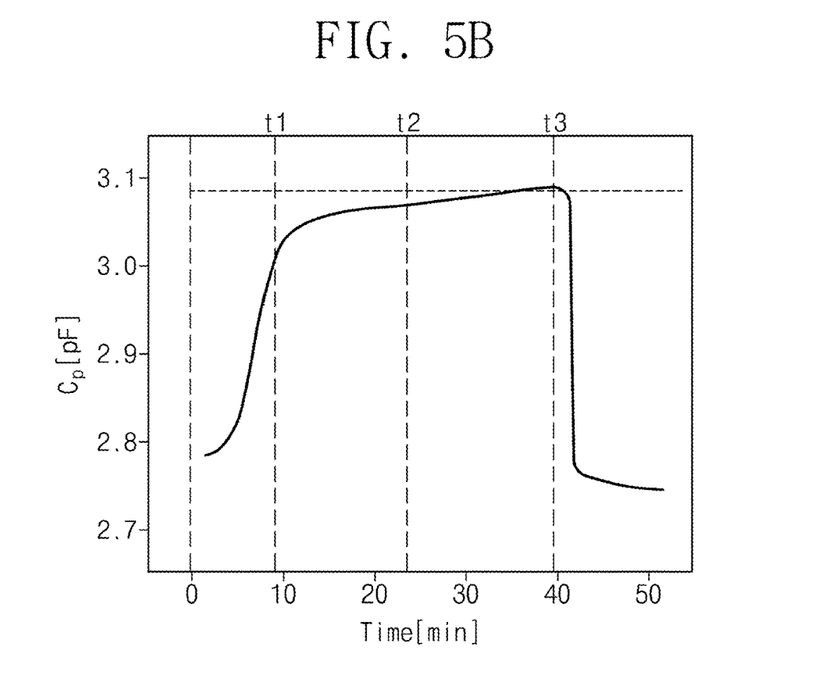
FIG. 5B is a graph illustrating capacitance depending on Comparative Example of the inventive concept.

FIG. 5A is a graph illustrating the capacitance depending on Experimental Example of the inventive concept. FIG. 5B is a graph illustrating the capacitance depending on Comparative Example of the inventive concept.

Referring to FIGS. 5A and 5B, it is seen that in the case of the humidity sensor, which includes the moisture absorption prevention layer, according to Experimental Example, water vapor may be absorbed onto a surface of the moisture absorption prevention layer to increase in capacitance rapidly till a first time t1. Also, it is seen that even when reaching a second time t2 and a third time t3, the water vapor is not absorbed into the substrate, and thus, the capacitance of the capacitor does not vary.

In the case of the humidity sensor, which does not include the moisture absorption prevention layer, according to Comparative Example, it is seen that the water vapor is adsorbed onto the substrate surface till the first time t1, and thus, the capacitance increases at a high speed. Thereafter, it is seen that water vapor is continuously absorbed into the substrate over the second time t2 and the third time t3, and thus, the capacitance continuously increases.

That is, when the moisture absorption prevention layer is formed on the substrate according to an embodiment of the inventive concept, the capacitance may be prevented from varying due to the substrate. Therefore, even if a polymer-based flexible substrate other than a silicon (Si) or glass substrate is used, the humidity sensor having excellent dynamic accuracy may be provided. Also, since the humidity sensor according to an embodiment of the inventive concept includes the moisture absorption prevention layer, a rate at which the capacitance between electrodes reaches the highest point may be high, and thus, the humidity sensor may have an excellent reaction rate.

Figure 6A:
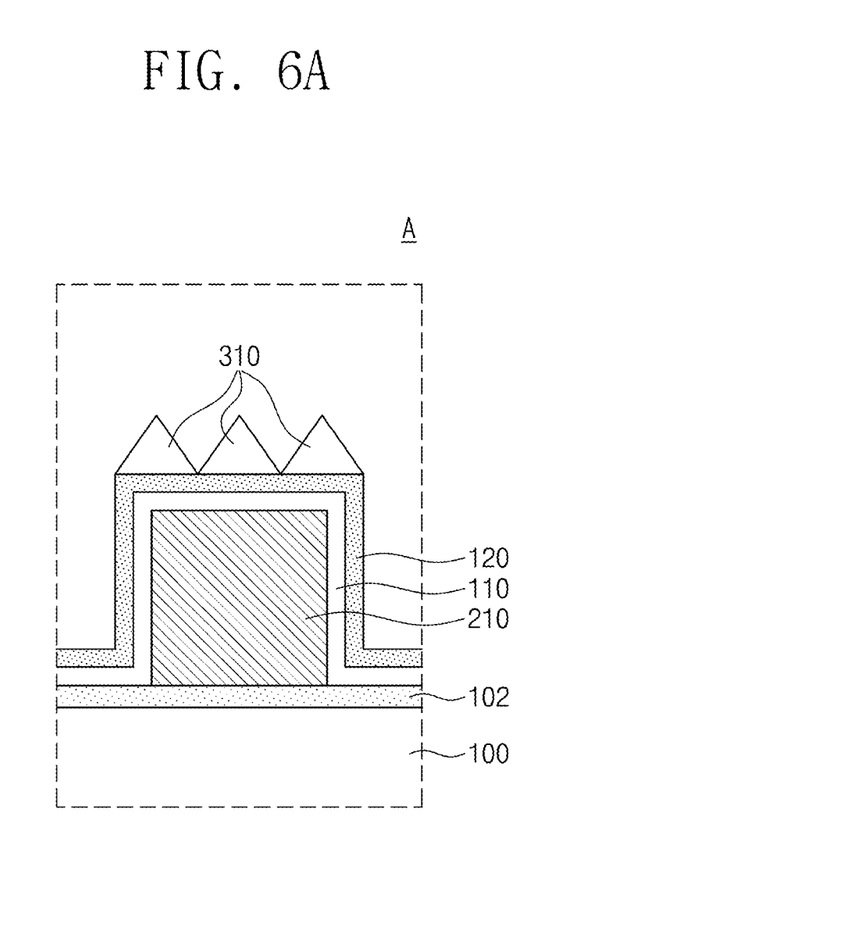
FIGS. 6A to 6C are views for explaining a humidity sensor, which corresponds to a portion A of FIG. 2, according to embodiments of the inventive concept.
Figure 6B:
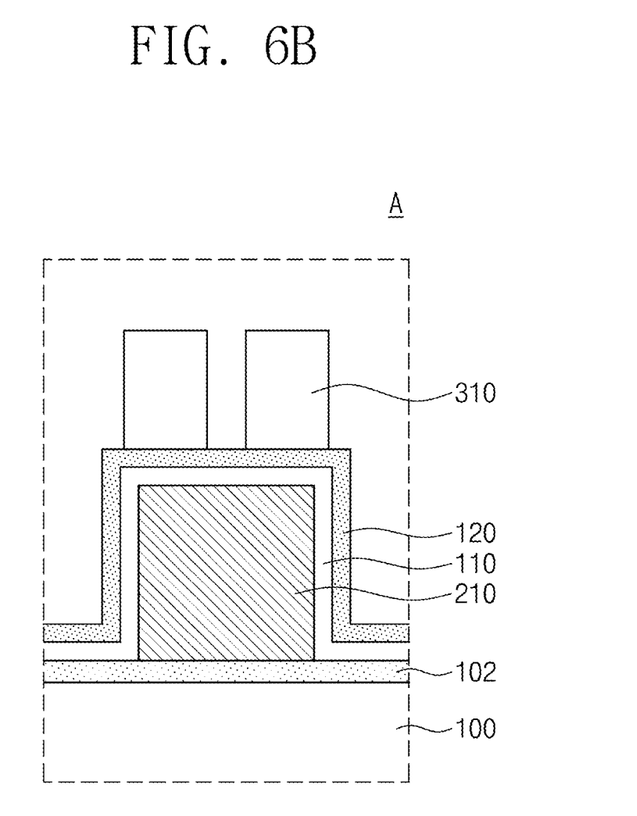
Figure 6C:
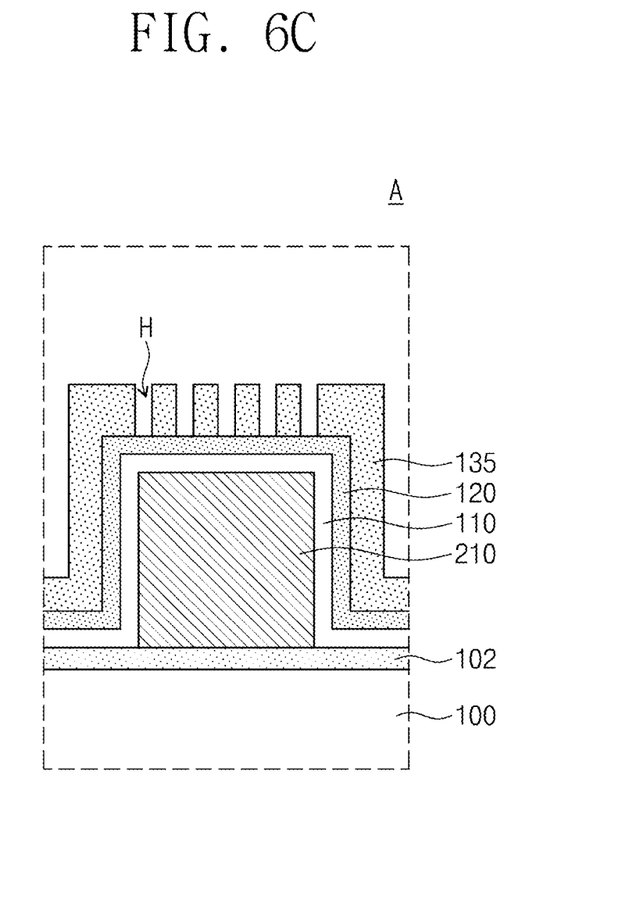

FIGS. 6A to 6C are views for explaining a humidity sensor, which corresponds to a portion A of FIG. 2, according to embodiments of the inventive concept; For concise description, detailed descriptions of the components described above may be omitted.

Referring to FIGS. 2 and 6A, a plurality of hydrophobic patterns 310 may be provided on a top surface of a buffer layer 120. The hydrophobic patterns 310 may be horizontally adjacent to each other. Each of the hydrophobic patterns 310 may have a triangular column shape. That is, each of the hydrophobic patterns 310 may have a width that gradually decreases as a distance from the buffer layer 120 increases. According to embodiments, lower ends of the hydrophobic patterns 310 may be in contact with each other.

Referring to FIGS. 2 and 6B, each of the hydrophobic patterns 310 may have a constant width from a top surface to a bottom surface thereof. For example, each of the hydrophobic patterns 310 may have a cylindrical or square pillar shape. The hydrophobic patterns 310 may be horizontally spaced apart from each other.

Referring to FIGS. 2 and 6C, a porous layer 135 may be provided on the top surface of the buffer layer 120. The porous layer 135 may have holes H through which the top surface of the buffer layer 120 is exposed. Each of the holes H may have a width less than that of the first electrode 210.

In this embodiment, the buffer layer may be omitted, and the porous layer 135 may be directly disposed on the dielectric layer 110.

Figure 7:
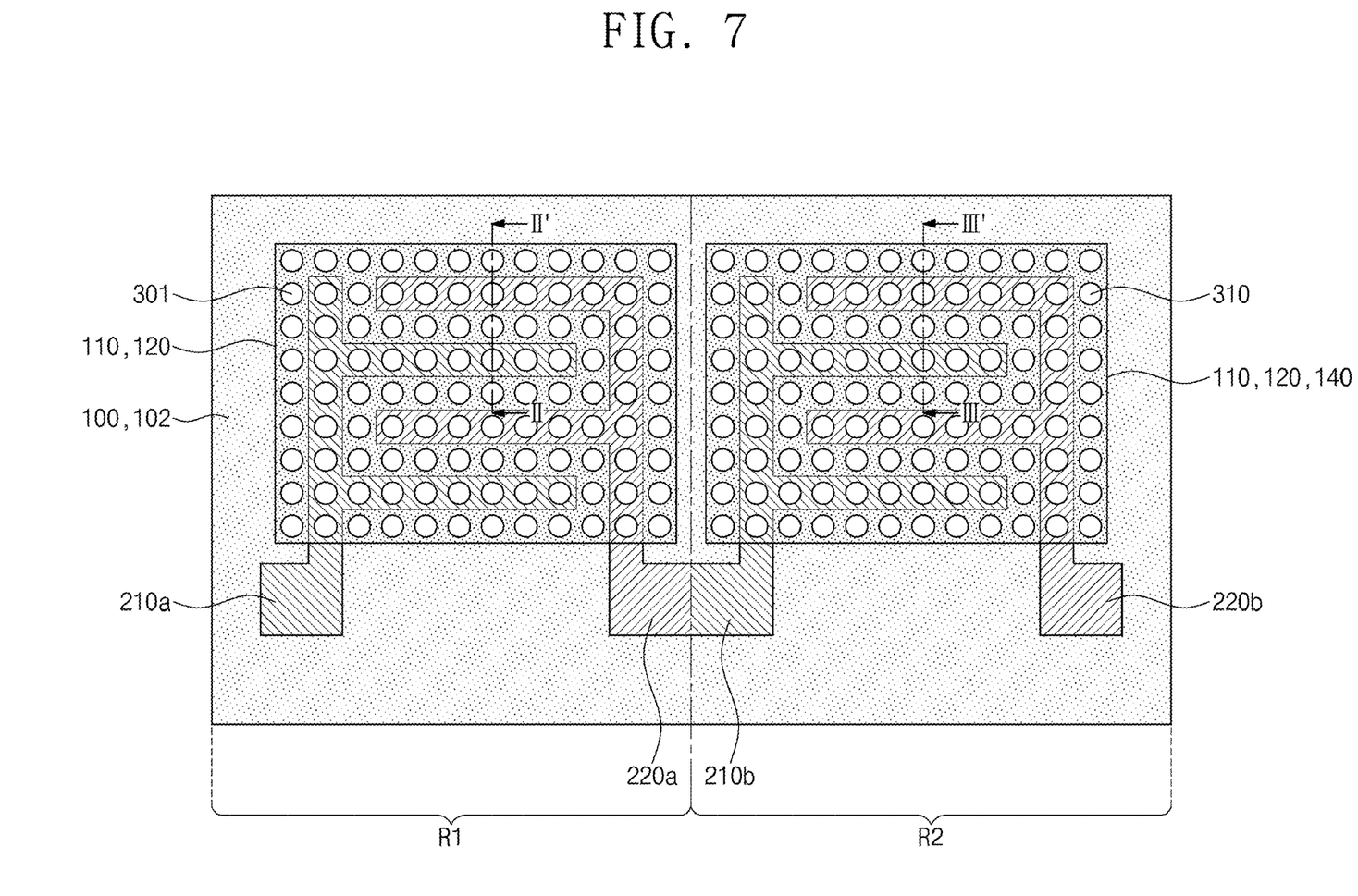
FIG. 7 is a plan view of a humidity sensor according to embodiments of the inventive concept.
Figure 8:
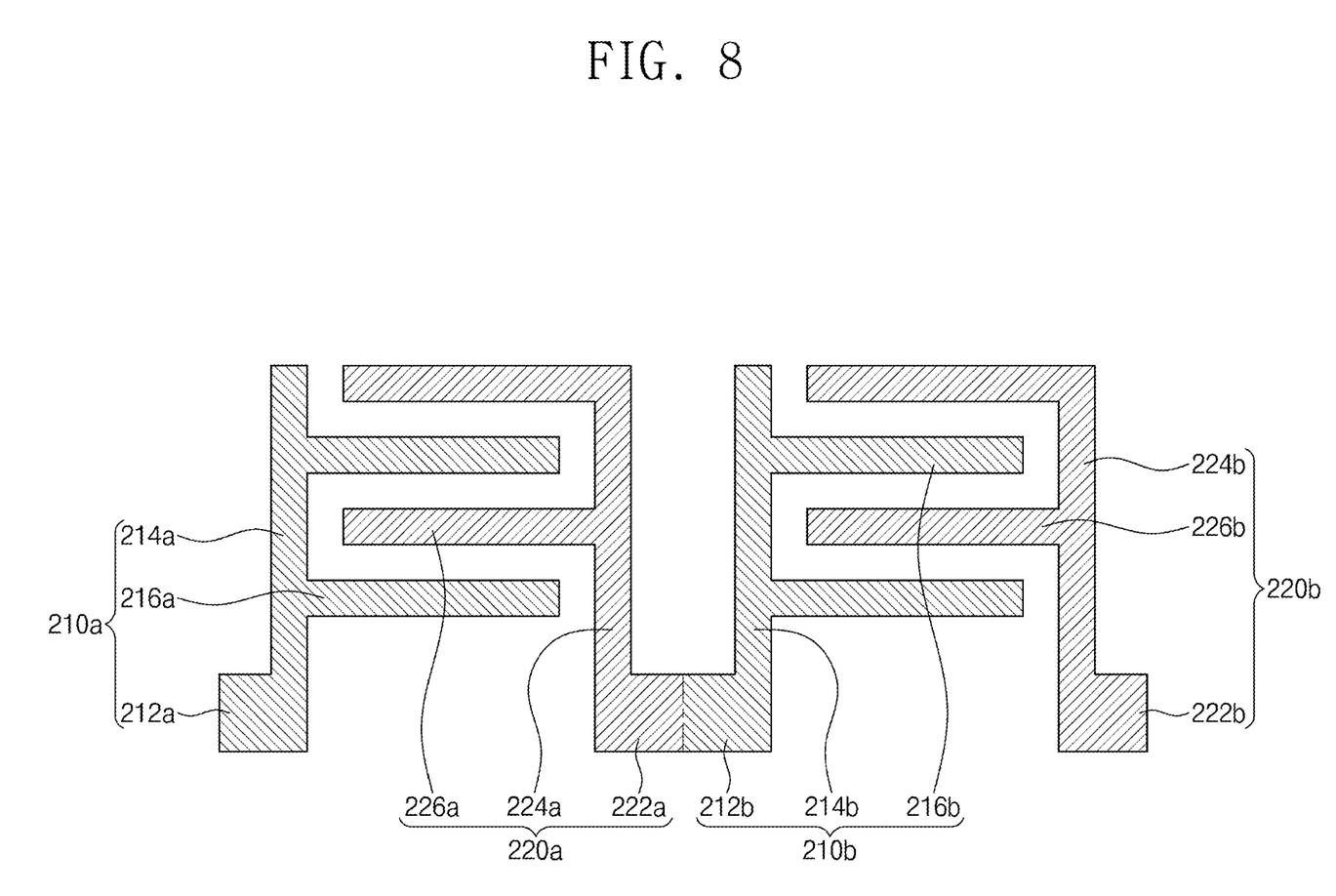
FIG. 8 is a plan view of electrodes according to embodiments of the inventive concept.
Figure 9:
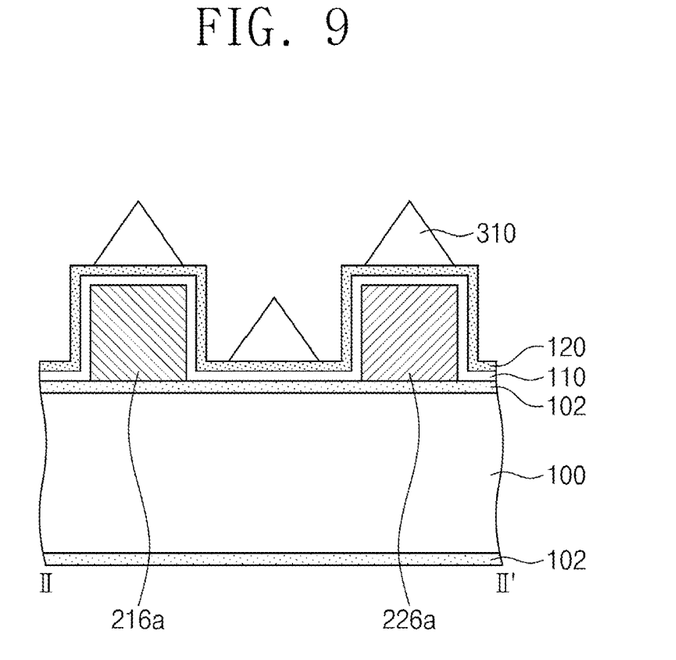
FIG. 9 is a cross-sectional view taken along line II-II' of FIG. 7.
Figure 10:
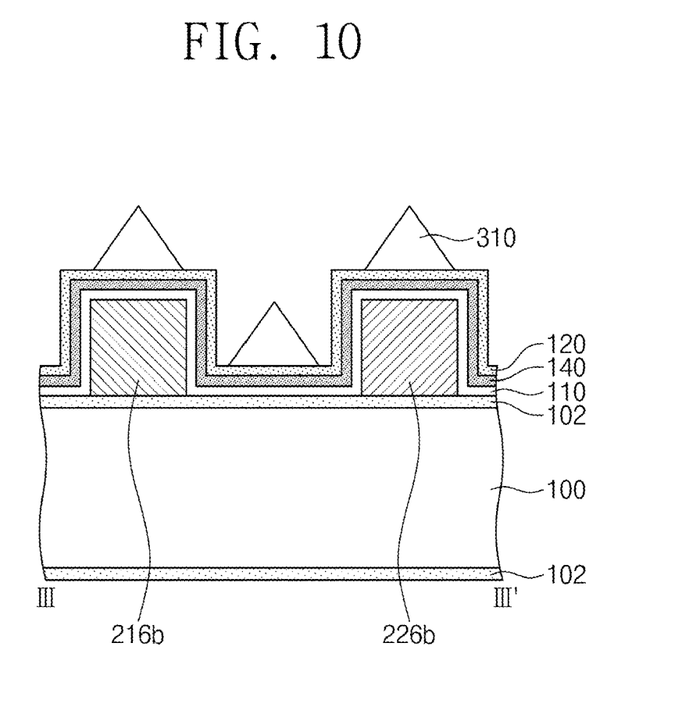
FIG. 10 is a cross-sectional view taken along line III-III' of FIG. 7.

FIG. 7 is a plan view of a humidity sensor according to embodiments of the inventive concept. FIG. 8 is a plan view of electrodes according to embodiments of the inventive concept. FIG. 9 is a cross-sectional view taken along line II-II' of FIG. 7. FIG. 10 is a cross-sectional view taken along line III-III' of FIG. 7. For concise description, detailed descriptions of the components described above may be omitted.

Referring to FIGS. 7 to 10, a substrate 100 according to an embodiment of the inventive concept may include a first area R1 and a second area R2 adjacent to the first area R1. The first area R1 may be a humidity measurement area, and the second area R2 may be a temperature measurement area.

A first electrode 210a and a second electrode 220a may be disposed on the first area R1 of the substrate 100. A third electrode 210b and a fourth electrode 220b may be disposed on the second area R2 of the substrate 100. A moisture absorption prevention layer 102 may be disposed between the first to fourth electrodes 210a, 220a, 210b, and 220b and the substrate 100.

In the first area R1, a dielectric layer 110, a buffer layer 120, and a hydrophobic pattern 310 may be sequentially disposed on the moisture absorption prevention layer 102. The dielectric layer 110, the buffer layer 120, and the hydrophobic pattern 310 may cover the first and second electrodes 210a and 220a. The dielectric layer 110 may be in direct contact with the buffer layer 120 and the moisture absorption prevention layer 102, and the buffer layer 120 may be in direct contact with the hydrophobic pattern 310.

In the second area R2, the dielectric layer 110, an upper moisture absorption prevention layer 140, the buffer layer 120, and the hydrophobic pattern 310 may be sequentially disposed on the moisture absorption prevention layer 102. That is, unlike the first area R1, the upper moisture absorption prevention layer 140 may be disposed between the dielectric layer 110 and the buffer layer 120 on the second area R2. The upper moisture absorption prevention layer 140 may include one of $Al_2O_3$, $ZnO$, $ZrO_2$, $TiO_2$, $HfO_2$, $SiO_x$, $SiN_x$, $SiOxN_y$, and ceramic. The upper moisture absorption prevention layer 140 may prevent moisture from being penetrated into the dielectric layer 110 to prevent capacitance between the third electrode 210b and the fourth electrode 220b, which are on the second area R2, from varying. Thus, capacitance of a capacitor disposed on the second area R2 may vary by a temperature regardless of humidity. The temperature measured by the capacitor disposed on the second area R2 may be used to correct a humidity value measured on the first area R1.

Figure 11:
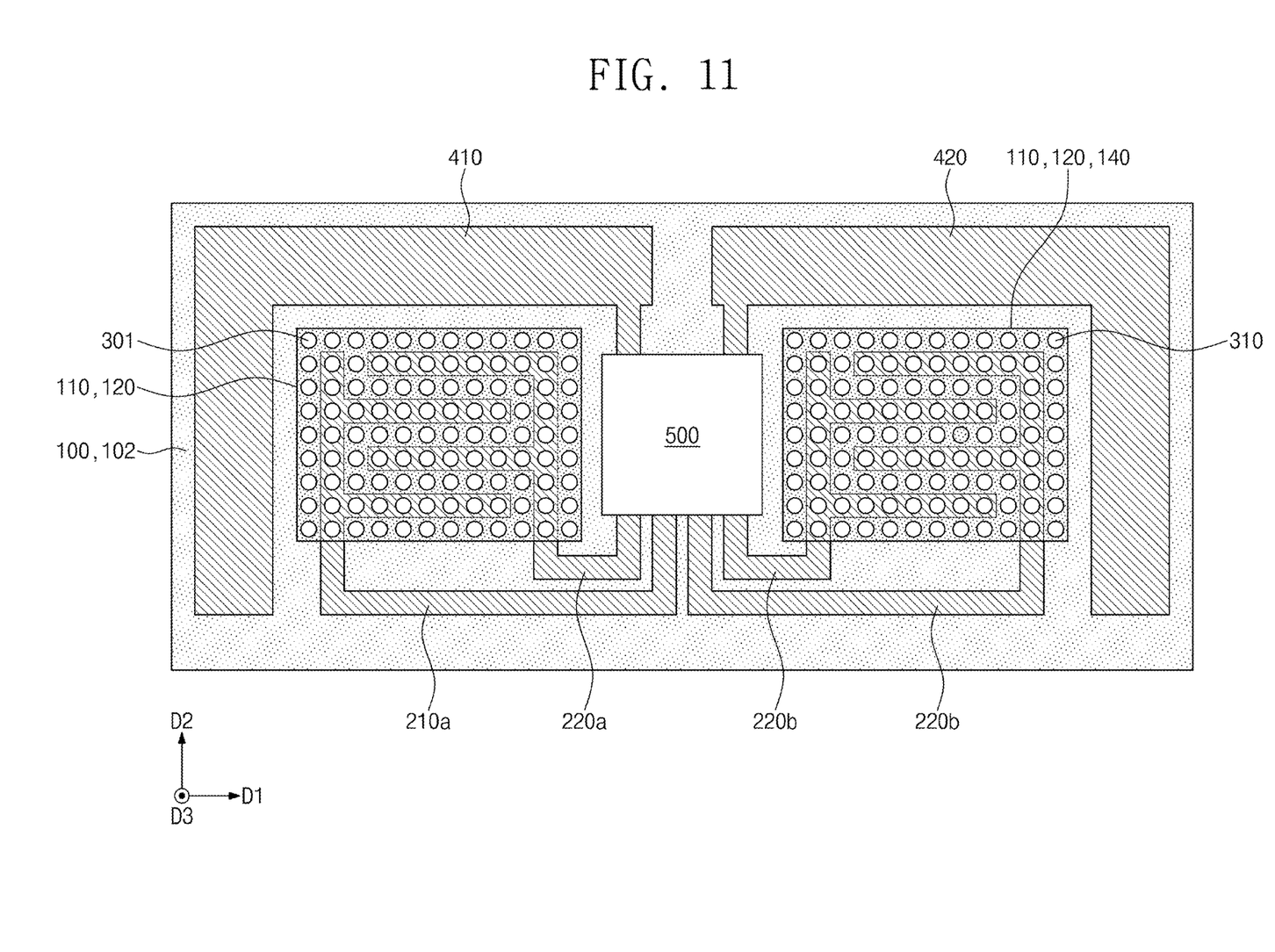
FIG. 11 is a plan view of a humidity sensor according to embodiments of the inventive concept.
Figure 12:
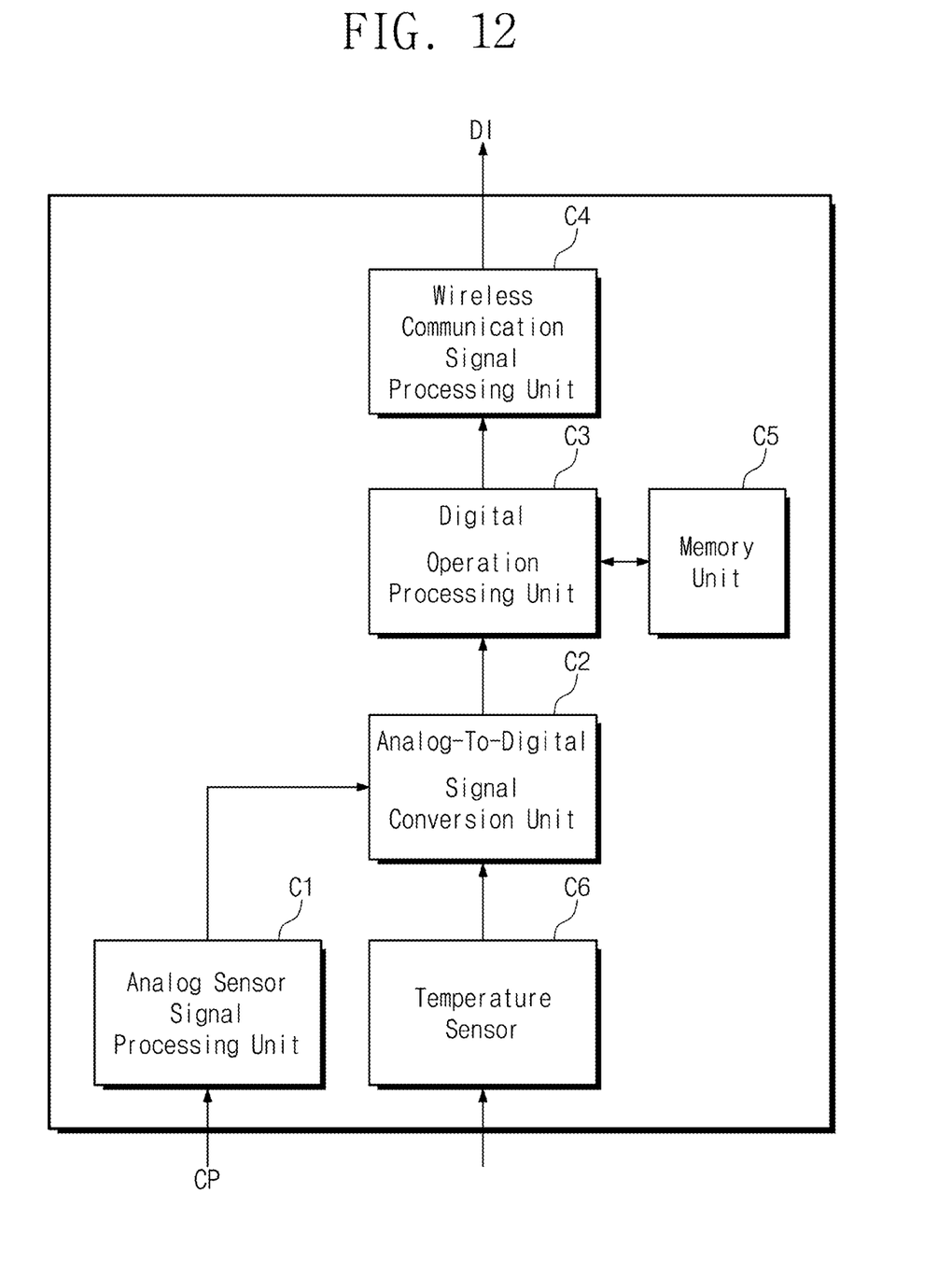
FIG. 12 is a conceptual view for explaining a controller according to embodiments of the inventive concept.

FIG. 11 is a plan view of a humidity sensor according to embodiments of the inventive concept. FIG. 12 is a conceptual view for explaining a controller according to embodiments of the inventive concept.

Referring to FIG. 11, a humidity sensor according to embodiments of the inventive concept may further include a controller 500 and antennas 410 and 420. The controller 500 may be connected to first to fourth electrodes 210a, 220a, 210b, and 220b to receive electrical signals from the first to fourth electrodes 210a, 220a, 210b, and 220b. The electrical signals may include, for example, capacitance information between the first electrode 210a and the second electrode 210b.

The antennas 410 and 420 may be disposed on a substrate 100. Each of the antennas 410 and 420 may have a curved shape and extend in the first direction D1 and the second direction D2 along an outer periphery of the substrate 100. The antennas 410 and 420 may include at least one of a single metal layer including Ag, Cu, and Al, or a multilayer metal layer in which a single metal layer is coated with Au. The antennas 410 and 420 may be electrically connected to the controller 500. A wireless communication frequency of each of the antennas 410 and 420 may have a value in the range of, for example, about 860 MHz to about 960 MHz.

Referring to FIGS. 11 and 12, the controller 500 according to embodiments of the inventive concept may include an analog sensor signal processing unit C1, an analog-to-digital signal conversion unit C2, a digital operation processing unit C3, and a wireless communication signal processing unit C4, and a memory unit C5.

The analog sensor signal processing unit C1 may receive electric signals generated from the first electrode 210a and the second electrode 210b. For example, each of the electrical signals generated from the first electrode 210a and the second electrode 210b may be an analog signal. The analog-to-digital signal conversion unit C2 and the digital operation processing unit C3 may receive analog signals from the analog sensor signal processing unit C1 to convert the analog signals into digital signals. Subsequently, the digital signals may be transmitted from the wireless communication signal processing unit C4 to the antennas 410 and 420. The antennas 410 and 420 may transmit the digital signals to an external element.

According to an embodiment, the controller 500 may further include a temperature sensor C6. The temperature sensor C6 may generate an electrical signal including temperature information, and provide the generated electrical signal to the analog-to-digital signal conversion unit C2. The temperature information measured through the temperature sensor C6 may be transmitted to the external element through the antennas 410 and 420 together with the humidity information.

According to embodiments, each of the third electrode 210b and the fourth electrode 220b may function as a temperature sensor. The third electrode 210b and the fourth electrode 220b may generate an electrical signal including temperature information and provide the generated electrical signal to the analog-to-digital signal conversion unit C2. In this case, the temperature sensor C6 in the controller 500 may be omitted.

According to the embodiments of the inventive concept, the humidity sensor having the excellent dynamic accuracy and the high response speed while maintaining the physical flexibility.

Those with ordinary skill in the technical field of the present invention pertains will be understood that the present invention can be carried out in other specific forms without changing the technical idea or essential features. Therefore, the above-disclosed embodiments are to be considered illustrative and not restrictive.

What is claimed is:

1. A humidity sensor comprising:
a flexible substrate;
a moisture absorption prevention layer covering the flexible substrate;
a dielectric layer on the moisture absorption prevention layer;
hydrophobic patterns on the dielectric layer;
a first electrode between the moisture absorption prevention layer and the dielectric layer; and
a second electrode spaced apart from the first electrode between the moisture absorption prevention layer and the dielectric layer,
wherein the first electrode has a thickness greater than that of the moisture absorption prevention layer.

2. The humidity sensor of claim 1, wherein the moisture absorption prevention layer covers top, bottom and side surfaces of the substrate.

3. The humidity sensor of claim 1, wherein the dielectric layer is in direct contact with the moisture absorption prevention layer between the first electrode and the second electrode.

4. The humidity sensor of claim 1, wherein the moisture absorption prevention layer has a water vapor transmission rate (WVTR) less than that of each of the flexible substrate and the dielectric layer.

5. The humidity sensor of claim 1, wherein the moisture absorption prevention layer comprises one of $Al_2O_3$, ZnO, $ZrO_2$, $TiO_2$, $HfO_2$, $SiO_x$, $SiN_x$, $SiOXN_y$, and ceramic.

6. The humidity sensor of claim 1, wherein the hydrophobic patterns comprise a first hydrophobic pattern on the first electrode, a second hydrophobic pattern on the second electrode, and a third hydrophobic pattern between the first electrode and the second electrode.

7. The humidity sensor of claim 1, wherein the flexible substrate comprises one of PET, PEN, PC, PES, and PI polymer.

8. The humidity sensor of claim 1, wherein the dielectric layer comprises at least one of cellulose acetate butyrate (CAB), PI, polymethyl methacrylate (PMMA), poly(hydroxyethyl methacrylate) (PHEMA), or poly(tetrafluoroethylene) (PTFE) polymer.

9. The humidity sensor of claim 1, wherein each of the hydrophobic patterns has a width that gradually decreases as a distance from a top surface of the flexible substrate increases.

10. The humidity sensor of claim 1, wherein the dielectric layer has a thickness more than that of the moisture absorption prevention layer.

11. A humidity sensor comprising:
a substrate;
a moisture absorption prevention layer covering top, bottom, and side surfaces of the substrate;
a first electrode on the moisture absorption prevention layer;
a second electrode spaced apart from the first electrode on the moisture absorption prevention layer; and
a dielectric layer covering the first electrode and the second electrode,
wherein the dielectric layer covers a top surface of the moisture absorption prevention layer between the first electrode and the second electrode.

12. The humidity sensor of claim 11, further comprising a hydrophobic pattern on the dielectric layer.

13. The humidity sensor of claim 11, wherein the moisture absorption prevention layer has a water vapor transmission rate (WVTR) less than that of each of the flexible substrate and the dielectric layer.

14. The humidity sensor of claim 11, wherein the moisture absorption prevention layer comprises one of $Al_2O_3$, ZnO, $ZrO_2$, $TiO_2$, $HfO_2$, $SiO_x$, $SiN_x$, $SiOxN_y$, and ceramic.

15. The humidity sensor of claim 11, further comprising:
a third electrode between the moisture absorption prevention layer and the dielectric layer; and
an upper moisture absorption prevention layer between the third electrode and the dielectric layer.

* * * * *